United States Patent
Marupaduga et al.

(10) Patent No.: US 12,096,500 B1
(45) Date of Patent: Sep. 17, 2024

(54) OPTIMIZING EN-DC NETWORKS

(71) Applicant: T-MOBILE INNOVATIONS LLC, Overland Park, KS (US)

(72) Inventors: Sreekar Marupaduga, Overland Park, KS (US); Michael Benitez Guimba, Snoqualmie, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 499 days.

(21) Appl. No.: 17/412,881

(22) Filed: Aug. 26, 2021

(51) Int. Cl.
*H04W 76/15* (2018.01)
*H04W 28/02* (2009.01)
*H04W 28/06* (2009.01)

(52) U.S. Cl.
CPC ....... *H04W 76/15* (2018.02); *H04W 28/0268* (2013.01); *H04W 28/06* (2013.01)

(58) Field of Classification Search
CPC .. H04W 76/15; H04W 28/0268; H04W 28/06
See application file for complete search history.

(56) References Cited

U.S. PATENT DOCUMENTS

| | | | |
|---|---|---|---|
| 11,711,862 B1 * | 7/2023 | Patel | H04W 76/15 370/329 |
| 2018/0027471 A1 * | 1/2018 | Zhang | H04W 36/0061 455/436 |
| 2020/0337054 A1 * | 10/2020 | Kwok | H04W 48/18 |

* cited by examiner

*Primary Examiner* — Mandish K Randhawa
(74) *Attorney, Agent, or Firm* — Shook, Hardy & Bacon L.L.P.

(57) ABSTRACT

Systems and methods are provided for dynamically optimizing EN-DC networks and include a first node, a second node, and one or more processors. The one or more processors are configured to receive data indicating that a first set of bands is present within a first sector and determine a high priority band from the first set of bands within the first sector. The system also identifies a first set of devices within a sector and defines a time frame for receiving data indicating a number of instances in which each device connected to the high priority band. A first status report comprising data indicating the number of instances each device connected to the high priority band is received and a performance rating is determined for the high priority band. The time frame for receiving data may be adjusted based on the performance rating and data from the first status report.

20 Claims, 4 Drawing Sheets

OPTIMIZING EN-DC NETWORKS

TECHNICAL FIELD

The present invention relates to the use of a system for optimizing EN-DC networks, substantially as shown in and/or described in connection with at least one of the figures, and as set forth more completely in the claims.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

In aspects set forth herein, systems and methods for optimizing EN-DC networks are disclosed. Generally, when a user equipment (UE) enters into a sector or coverage area, it connects to an LTE channel. Once the UE connects to the LTE channel, the UE is instructed to look for 5G frequencies and report back on the 5G frequencies available and their signal strength. When instructed, the UE is given a limited time period in which it must collect data regarding the 5G channels available and report back to the LTE channel. The time frame set for this information has historically been static and did not change. As such, if a UE was given 200 milliseconds to obtain data regarding available 5G channels, there were instances in which the UE would not have enough time to locate each 5G channel and report that back. The static time frame given to a UE could then result in a UE not connecting to a high priority 5G channel, which would then result in the loss of utilizing high capacity bandwidth that may be available and also impacts the UE's throughput.

The present system addresses this problem by providing systems and methods to optimize EN-DC networks by allowing a eNodeB to dynamically adjust the time frame that a UE has to locate and connect to a 5G high priority band, thereby allowing for more instances for the UE to connect to the 5G high priority band, which allows the UE to utilize the high capacity bandwidth of the 5G high priority band, thereby resulting in better resource allocation and also improving UE throughput.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. Various technical terms are used throughout this description. An illustrative resource that fleshes out various aspects of these terms can be found in Newton's Telecom Dictionary, 25th Edition (2009).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a user equipment (UE), such as a wireless communication device (WCD), according to a single protocol (e.g., 3G, 4G, LTE, 5G, and the like); however, in other aspects, a single access point may communicate with a UE according to multiple protocols. As used herein, a base station may comprise one access point or more than one access point. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an EnodeB). In this regard, typically only one active uplink connection can occur per frequency. The base station may include one or more sectors served by individual transmitting/receiving components associated with the base station (e.g., antenna arrays controlled by an EnodeB). These transmitting/receiving components together form a multi-sector broadcast arc for communication with mobile handsets linked to the base station.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station or access point.

In aspects, a UE provides location and channel quality information to the wireless communication network via the access point. Location information may be based on a current or last known position utilizing GPS or other satellite location services, terrestrial triangulation, an access point's physical location, or any other means of obtaining coarse or fine location information. Channel quality information may indicate a realized uplink and/or downlink transmission data rate, observed signal-to-interference-plus-noise ratio (SINR) and/or signal strength at the user device, or throughput of the connection. Channel quality information may be provided via, for example, an uplink pilot time slot, downlink pilot time slot, sounding reference signal, channel quality indicator (CQI), rank indicator, precoding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the access point or at the individual antenna array of the access point 0. In other aspects, the processing of said information may be done remotely.

Generally speaking, many modern UEs comprise at least two transmitters; in some configurations, a UEs may operate using dual connectivity. That is, the UE may use at least a first of its transmitters to communicate a first uplink signal to a first node at an access point and at least a second of its transmitters to communicate a second uplink signal to a second node at the access point. In other configurations, a UE may operate using single connectivity, wherein it uses one or more of its transmitters to communicate with a single access point, base station, or cell site at one or more nodes. Whether using dual connectivity or single connectivity, a UE may have a pre-set maximum total uplink power (as will be discussed in greater detail below). Conventionally, a communication session between a UE and an access point comprises an uplink handshake, wherein the uplink handshake is an uplink signal from the UE to an access point, conventionally transmitted at the pre-set maximum uplink power. Once the handshake occurs, the network and/or the device may determine that the uplink power may be reduced (e.g., if, based on proximity or line of sight, it is determined that only half of the maximum pre-set uplink power is necessary to effectively propagate the uplink signal to the access point). The opposite, UE may not increase the power of the transmission (it may retry again later or attempt to connect to a different access point, for example).

The present disclosure is directed to systems, methods, and computer readable media for dynamically optimizing EN-DC networks by dynamically adjusting the time allowed for a UE to report the available 5G carriers with respective signal strengths for each 5G carrier. In the past, the time allotted to each UE to report this information was static, which impacted UE performances in situations where a high priority carrier is not reported within the defined time frame set. As such, the present disclosure describes a system in which the eNodeB is configured to dynamically adjust the time frame by increasing or decreasing the time frame in which a UE may connect with the highest priority 5G band. Additionally, the eNodeB is able to take into account the performance of a high priority carrier for the give sector prior to the implementation of any adjustments to the time frame given to the UEs to connect to the high priority band.

Key performance indicators (KPI) may also be utilized in determining whether the time frame should be dynamically adjusted. If the key performance indicators on the highest priority carrier are below a defined threshold or performing poorly, then the time frame may reduce so that the high priority carrier is ignored. By contrast, if the KPIs are above a defined threshold or performing well, but the number of instances that each UE connected to the high priority band during the defined time frame is low, then the system may adjust the time frame by increasing the amount of time the UE has to identify and connect to the high priority 5G band before reporting back.

A first aspect of the present disclosure is directed to a system for dynamically optimizing EN-DC networks. The system comprises a first node configured to wirelessly communicate with one or more UEs or WCDs in a geographic service area. The system also comprises one or more processors that are configured to perform various operations including receiving data indicating that a first set of bands is present within a first sector. The processors then determine a high priority band from the first set of bands within the first sector and identify a first set of UEs located within the first sector. A time frame is defined for receiving data indicating the number of instances in which each UE within the first set of UEs connected to the high priority band. A first status report is received that comprises data indicating the number of instances each UE within the first set of UEs connected to the high priority band during the defined time frame. Using data from the first status report, the system will determine a performance rating of the high priority band and then dynamically adjust the time frame for receiving data indicating the number of instances in which each UE within the first set of UEs connected to the high priority band in order to optimize the performance of the first set of UEs. In some instances, the system may further assign a priority ranking to each of the first set of bands identified from highest to lowest priority. The first set of bands may comprise one or more of band n41, band n71, band n25, 5G EN-DC, 5G, mmwave, LTE, etc.

A second aspect of the present disclosure is directed to a method for dynamically optimizing EN-DC networks beginning with receiving data indicating that a first set of bands are present within a first sector and determining a high priority band from the first set of bands within the first sector. For example, if the first set of bands include band n41, band n71, and 5G EN-DC, one of the bands will be determined to be the high priority band. Generally, the band determined to be high priority is the band with the greatest bandwidth. Based on this, a first set of UE's are identified within a first sector or coverage area. A time frame is defined for receiving data indicating a number of instances in which each UE within the first set of UEs connected to the high priority band. A first status report is received that comprises data that indicates the number of each UE within the first set of UEs connected to the high priority band within the defined time frame. Then, based on the first status report received and a performance rating determined for the high priority band, the time frame is dynamically adjusted in order to optimize the performance of the first set of UEs.

In aspects, the method further includes determining the number of instances in which each UE within the first set of UEs is connected to the high priority band is below a predetermined threshold. The method may also include determining a performance rating based on determining one or more key performance indicators. When the performance rating is above a performance rating threshold, the time frame is increased for receiving data indicating the number of instances that a UE within the first set of UEs is connected to the high priority band. By contrast, if the performance rating is below the performance rating threshold, then the time frame for receiving data may be decreased.

Another aspect of the present disclosure is directed to another example system for optimizing EN-DC networks comprising a first node configured to wirelessly communicate with one or more UEs in a geographic service area and one or more processors configured to perform operation comprising receiving data indicating that a first set of bands are present within a first sector. A high priority band is determined from the first set of bands within the first sector and a first set of UEs located within the first sector are identified. Then, the system will define a time frame for receiving data that indicates a number of instances in each UE within the first set of UEs connected to the high priority band. The processor also receives a first status report comprising data indicating the number of instances each UE within the first set of UEs connected to the high priority band within the defined time frame, and then based on the first status report received within the defined time frame, dynamically adjusting the time frame to optimize performance of the first set of WCDs Turning to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Figure 1:
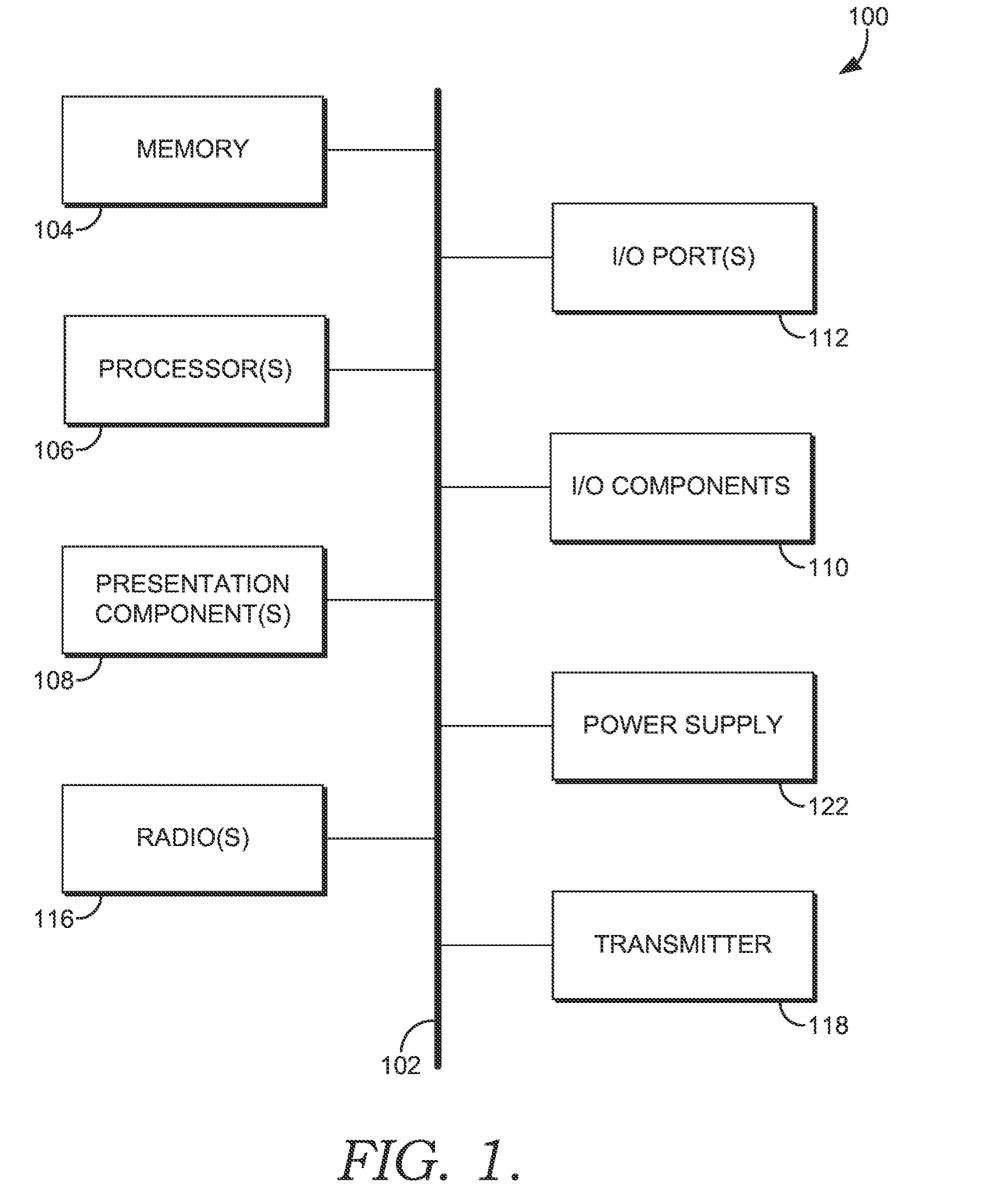
FIG. 1 depicts a diagram of an exemplary computing environment suitable for use in implementations of the present disclosure, in accordance with aspects herein.

With continued reference to FIG. 1, computing device 100 includes bus 102 that directly or indirectly couples the following devices: memory 104, one or more processors 106, one or more presentation components 108, input/output (I/O) ports 112, I/O components 110, radio 116, transmitter 118, and power supply 122. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 110. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 110. One or more presentation components 108 presents data indications to a person or other device. Exemplary one or more presentation components 108 include a display device, speaker, printing component, vibrating component, etc. I/O ports 112 allow computing device 100 to be logically coupled to other devices including I/O components 110, some of which may be built into computing device 100. Illustrative I/O components 110 include a microphone, joystick, game pad, satellite dish, scanner, printer, wireless device, etc.

The radio 116 represents one or more radios that facilitate communication with a wireless telecommunications network. While a single radio 116 is shown in FIG. 1, it is contemplated that there may be more than one radio 116 coupled to the bus 102. In aspects, the radio 116 utilizes a transmitter 118 to communicate with the wireless telecommunications network. It is expressly conceived that a computing device with more than one radio 116 could facilitate communication with the wireless telecommunications network via both the first transmitter 118 and an additional transmitters (e.g. a second transmitter). Illustrative wireless telecommunications technologies include CDMA, GPRS, TDMA, GSM, and the like. The radio 116 may additionally or alternatively facilitate other types of wireless communications including Wi-Fi, WiMAX, LTE, 3G, 4G, LTE, 5G, NR, VOLTE, or other VoIP communications. As can be appreciated, in various embodiments, radio 120 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
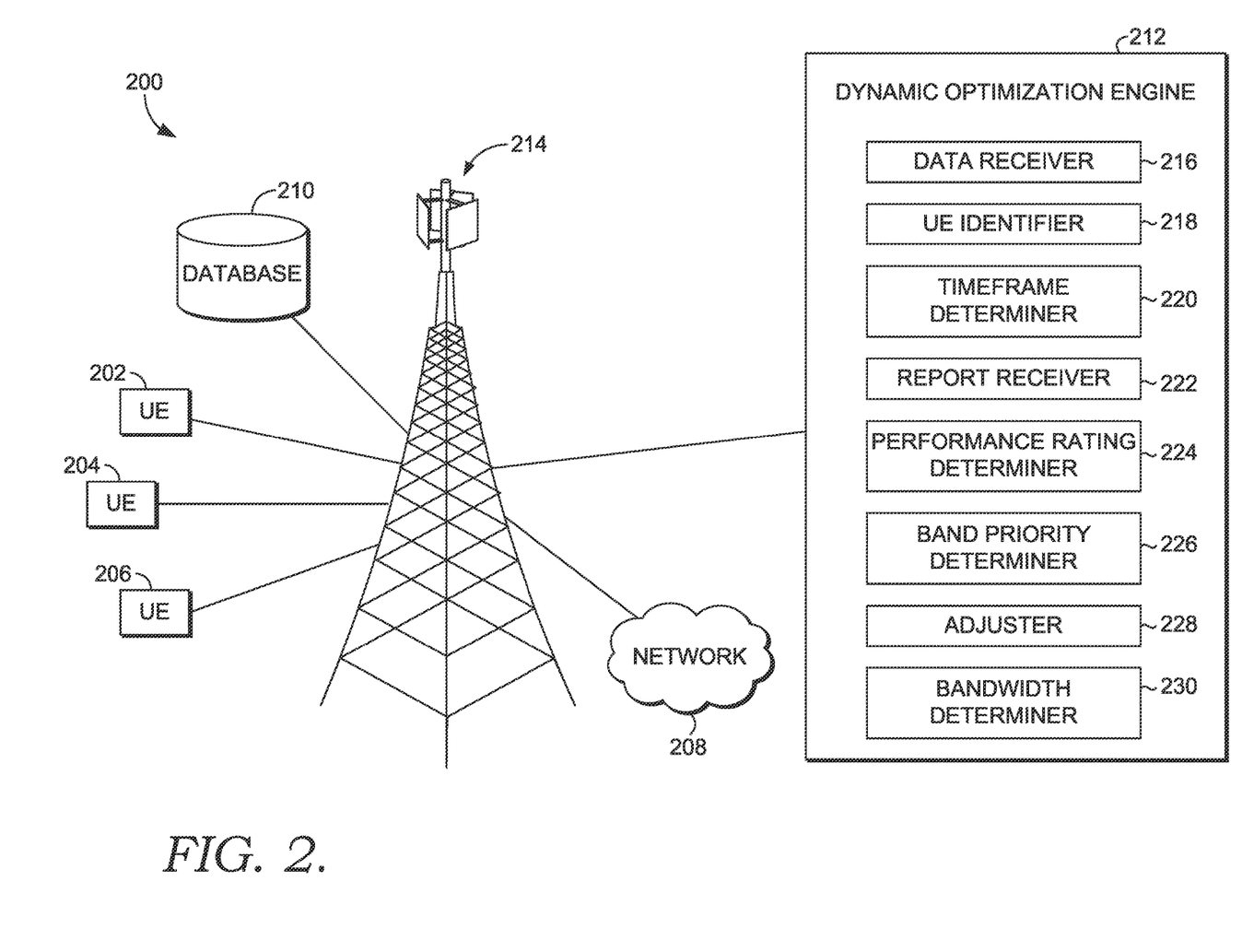
FIG. 2 illustrates a diagram of an exemplary network environment in which implementations of the present disclosure may be employed, in accordance with aspects herein.

Next, FIG. 2 provides an exemplary network environment in which implementations of the present disclosure may be employed. Such a network environment is illustrated and designated generally as network environment 200. Network environment 200 is not to be interpreted as having any dependency or requirement relating to any one or combination of components illustrated.

Network environment 200 includes user devices (UE) 202, 204, and 206, access point 214 (which may be a cell site, base station, or the like), network 208, database 210, and dynamic optimizing engine 212. In network environment 200, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 100) that communicates via wireless communications with the access point 214 in order to interact with a public or private network.

In some aspects, the UEs 202, 204, and 206 can correspond to computing device 100 in FIG. 1. Thus, a user device can include, for example, a display(s), a power source(s) (e.g., a battery), a data store(s), a speaker(s), memory, a buffer(s), a radio(s) and the like. In some implementations, for example, a UE 202 comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, UE 202 in network environment 200 can optionally utilize network 208 to communicate with other computing devices (e.g., a mobile device(s), a server(s), a personal computer(s), etc.) through cell site 214. The network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network 208 can include multiple networks, as well as being a network of networks, but is shown in more simple form so as to not obscure other aspects of the present disclosure.

Network 208 can be part of a telecommunication network that connects subscribers to their immediate service provider. In some instances, network 208 can be associated with a telecommunications provider that provides services (e.g., LTE) to user devices, such as UE 202. For example, network 208 may provide voice, SMS, and/or data services to user devices or corresponding users that are registered or subscribed to utilize the services provided by a telecommunications provider. Network 208 can comprise any communication network providing voice, SMS, and/or data service(s), such as, for example, a 1x circuit voice, a 3G network (e.g., CDMA, CDMA2000, WCDMA, GSM, UMTS), a 4G network (WiMAX, LTE, HSDPA), or a 5G network.

In some implementations, access point 214 is configured to communicate with a UE, such as UE 202, that is located within the geographical area, or cell, covered by radio antennas of access point 214. Cell site or access point 214 may include one or more base stations, base transmitter stations, radios, antennas, antenna arrays, power amplifiers, transmitters/receivers, digital signal processors, control electronics, GPS equipment, and the like. In particular, access point 214 may selectively communicate with the user devices using dynamic beamforming.

As shown, access point 214 is in communication with dynamic optimization engine 212, which comprises various components that are utilized, in various implementations, to perform one or more methods for dynamically optimizing EN-DC networks by dynamically adjusting the time frames for a UE to report all 5G carriers. In aspects, the dynamic optimizing engine 212 comprises components including a data receiver 216, a UE determiner 218, a time frame determiner 220, a report receiver 222, performance rating determiner 224, a band priority determiner 226, an adjuster 228, and a bandwidth determiner 230. However, in other implementations, more or less components than those shown in FIG. 2 may be utilized to carry out aspects of the invention described herein.

The data receiver 216 of the dynamic optimization engine 212 is configured to receive data indicating that a first set of bands is present within a first sector. For example, for the first sector, data receiver 216 may receive data that indicates that there are three bands present within the first sector. The bands present may vary based on the sector location, but may include, for example band n41, band n25 and EN-DC. Any number of bands may be present within the same sector and include additional bands not mentioned herein. As mentioned, typically when a dual capacity UE enters into a sector, it will connect to the LTE band, which will then direct the UE to identify 5G bands available and their corresponding frequencies to determine which 5G band the UE should connect for the best throughput and optimization.

Once the data receiver 216 receives the data indicating a first set of bands is present within the first sector, the band priority determiner 226 determines which band is high priority form the first set of bands in the first sector. Continuing with the current example, the band priority determiner 226 may determine, based on the data received by the data receiver 216, that band n41 is the high priority band. In order to determine which band is high priority, the band priority determiner 226 may rely on data such as key performance indicators and the bandwidth of each band. Generally speaking, the band with the greatest bandwidth capacity will likely be determined by the band priority determiner to be the high or highest priority band, depending on the number of bands present. Additionally, the band priority determiner may also assign a priority ranking to each band present from lowest to highest priority.

UE identifier 218 is configured to identify a first set of UE's located within the first sector. The first set of UEs located within the first sector may include any number of UEs. Additionally, the UE identifier 218 may determine a limit to the number of UEs in the first set or may identify the first set of UEs based on a predetermined time frame. For example, the UE identifier 218 may be configured to identify a set of UEs in the first sector every 30 minutes. In other instances, the UE identifier may be configured to identify a set of UEs in the first sector at any time interval desired.

Once the UE identifier 218 has identifier a first set of UEs located within the firs sector, the time frame determiner 220 defines a time frame for receiving data from the first set of UE's indicating the number of instances in which each UE within the first set of UEs connected to the high priority band. Up until now, the time frame for each UE to collect the data and transmit it to the dynamic optimization engine 212 was static. As such, the time frame remained the same regardless of how many UEs were in the first set of UEs, which bands were present in the first set of bands, or how loaded a sector might be. This led to inefficiencies, poor optimization of the EN-DC network, loss of bandwidth capacity, and decreased UE throughput as instances occurred in which the time frame was not long enough for a UE to connect to a high priority band. As such, the UE instead connected to a lower priority 5G band, thereby resulting in a less optimal wireless communication session. The time frame determined by the time frame determiner 220 may be set by a network operator for two or more bands operating on different frequencies within one sector.

The report receiver 222 receives a first status report that comprises data indicating the number of instances that each UE within the first set of UEs connected to the high priority band. In addition to this information, the report receiver may receive additional data in the first status report such as data regarding key performance indicators and bandwidth for each of the bands in the first sector. Using this information, the performance rating determiner 224 will determine a performance rating of the high priority band. If the performance rating of the high priority band is low or poor, it indicates that the number of instances in which each UE connected to the high priority band were low and that the high priority band is not performing well. By contrast, if the performance rating determined by the performance rating determiner 224 is high, then the number of instances that each UE within the first set of UEs connected to the high priority band is high and the performance of the high priority band is strong.

Based on the performance rating determined, the adjuster 228 can dynamically adjust the time frame to optimize the performance of the first set of WCDs. If the performance rating is high, then the adjuster 228 may adjust the time frame for receiving indications the number of instances that each UE connects to the high priority by decreasing the time frame. In other instances, the adjuster 228 may leave the time frame determined by the time frame determiner 220 the same in cases where the performance rating is high. For example, if the performance rating determiner 224 determines that the high priority band has a high performance rating, the adjuster 228 may adjust the determined time frame from 250 milliseconds to 225 milliseconds.

On the other hand, if the performance rating is low, the adjuster can increase the time frame for receiving data (e.g. increase the time frame from 200 milliseconds to 300 milliseconds). This dynamic adjustment may allow the number of instances that each UE within the first set of UEs connects to the high priority band to increase. For example, if the time frame determiner 220 initially determines the time frame for receiving the first status report to be 200 milliseconds, each UE within the first set of UE's will transmit data to the report receiver 222 indicating the number of instances that each UE was able to connect to the high priority band. For exemplary purposes, if there are three UE's in the first set of UEs, then the first status report received by the report receiver 222 will include data that indicates the number of instances that each of the three UEs in the first set of UEs connected to the designated high priority band within the 200 millisecond time frame. During this time, the UE may be able to connect once or several times to the high priority band.

If the performance rating is low, then the adjuster 228 may increase the time frame that each UE has to connect to the high priority band. This may allow UEs that did not have the opportunity to connect to the high priority band within the 200 milliseconds to now connect to the high priority band, thereby optimizing the performance of the UEs. For example, if the first status report indicated that only two of the three UEs in the first set of UEs connected to the high priority band during the 200 millisecond time frame set and the performance rating of the high priority band is determined to be low, then the adjuster may increase the time frame from 200 milliseconds to 300 milliseconds in order to allow for more time in which the UE that was not able to connect to the high priority band to connect to the high priority band. While the disclosure discusses example numbers of UEs in the first set of UEs and example time frames, the number of UEs and time frames are for exemplary purposes only and it is contemplated that any number of UEs may be a part of the first set of UEs and that any applicable time frame may be determined by the time frame determiner 220.

The performance rating determiner 224 may base the performance rating of the high priority band on one or more key performance indicators (KPIs). KPIs and bandwidth determinations for each band will also contribute to the performance rating determined by the performance rating determiner 224. As such, if the number of instances that a UE connected with the high priority band within the 200 millisecond time frame is low (e.g. 10 times out of 100 possible instances), but the performance rating of the high priority band is determined to be high or strong, then the adjuster 228 may increase the time frame (e.g. from 200 milliseconds to 300 milliseconds) to allow the UEs in the first set of UE's more opportunities to connect to the higher priority band with the greater bandwidth, thereby resulting in more optimal utilization of resources and better throughput. On the other hand, if the number of instances that the UE connected to the high priority band is low and the KPI are also low, then the adjuster will take no action and the time frame will remain constant. In another instance, if it is determined that the number of instances that a UE connected to a high priority band is high, but the KPI are low, then the adjuster 228 may instead decrease the time frame since the KPIs are not performing well and therefore it is not ideal to have too many users connecting to the high priority band that is not functioning optimally.

As mentioned, there may be multiple bands present within a given sector. For example, there may be a band n41, band n71, band n25, 5G EN-DC, 5G, and LTE. When there are multiple bands present, the band priority determiner 226 will determine which band is the high priority band. Additionally, as also mentioned the band priority determiner 226 can also assign a priority ranking to each of the first set of bands, identifying them from highest priority to lowest priority. In aspects, the dynamic optimizing engine 212 may also include components such as a bandwidth determiner 230, which may assign a predetermined bandwidth to each band within the first set of bands. When the dynamic optimizing engine 212 utilizes the bandwidth determiner 230, the band priority determiner 226 will prioritize the bands based on the predetermined bandwidth by the bandwidth determiner 230. As such, the band with the highest predetermined bandwidth will be assigned the highest priority by the band priority determiner 226.

In aspects, the adjuster 228 may determine whether the number of instances each UE within the first set of UEs is connected to the high priority band is above or below a predetermined threshold value. When the number of instances in which each UE within the first set of UEs connected to the high priority band is below the predetermined threshold value, the adjuster can dynamically increase the time frame for receiving data indicating the number of instances in which each UE within the first set of UEs connected to the high priority band. This will allow for each UE to have more time to connect to the high priority band, resulting in better throughput and optimization of the EN-DC network. By contrast, if the number of instances that each UE connects to the high priority band is above a predetermined threshold, the adjuster 228 may utilize other factors discussed such as the KPI or performance rating in order to determine whether to keep the time frame the same or potentially decrease the time frame set.

Figure 3:
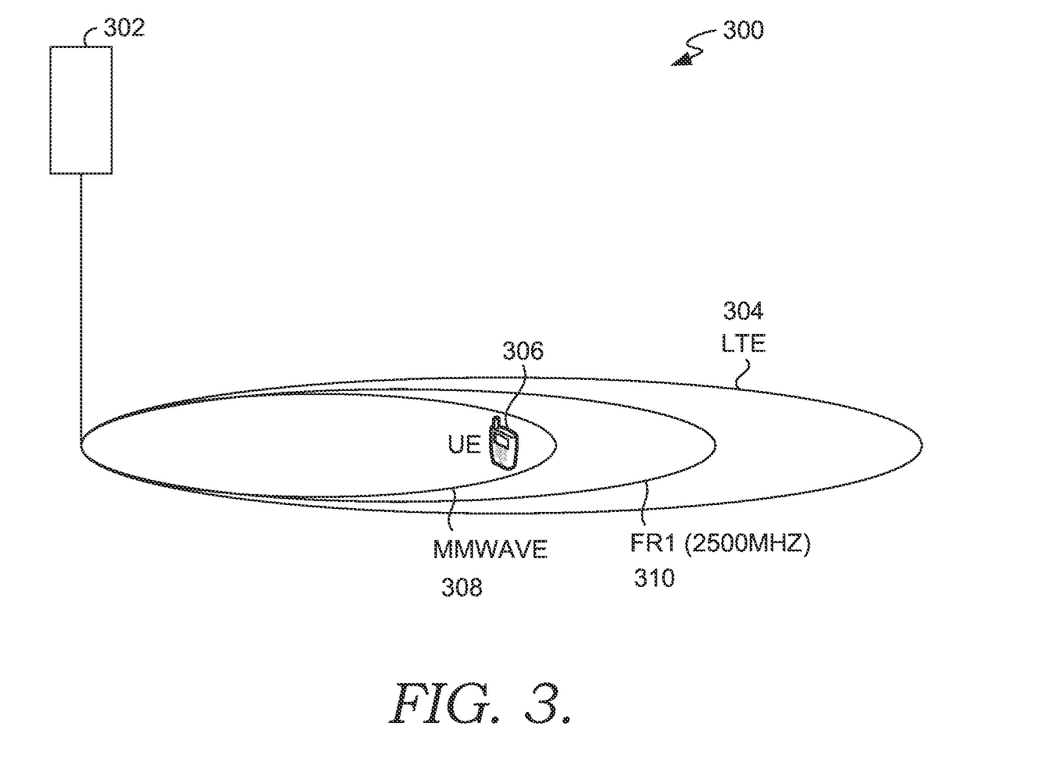
FIG. 3 illustrates a scenario where implementations of the present disclosure are implemented optimize an EN-DC network, in accordance with aspects herein.

Next, FIG. 3, illustrates a scenario where implementations of the present disclosure are implemented to optimize an EN-DC network, in accordance with aspects herein and is not intended to suggest any limitations as to the scope of use or functionality of embodiments described herein. Neither should the configuration be interpreted as having any dependency or requirement relating to any one or combination of components illustrated. FIG. 3 includes scenario 300 in which there is a node 302 and three bands present: the LTE band, labeled as 304; the mmwave band, labeled as 308, and the 2500 MHZ band, labeled as 310. In this scenario, once the system has received data indicating one or more bands are present within the sector, the band priority determiner 226 determines the band with the highest priority based on bandwidth. In this example, the mmwave band 208 has a greater bandwidth than the LTE 304 and 2500 MHZ 310 bands and would be the high priority band.

As discussed with respect to FIG. 2, the UE determiner 218 will identify a first set of UEs present within the first sector. In the scenarios shown in FIG. 3, there is only one UE, UE 306 shown for simplicity purposes. However, it is contemplated that there may be more UEs identified in any given sector by the UE identifier 218. The time frame determiner 220 determines the time frame for receiving data from the UE 306 indicating the number of instances that UE 306 connected to the high priority band (mmwave band 308) in this scenario. For exemplary purposes, the time frame may be as small as 200 milliseconds. The report receiver 222 will receive a first status report form UE 306 after the 200 millisecond time frame that will indicate the number of instances that the UE 306 connected to high priority band, mmwave band 308. Additionally, the first status report may include data regarding key performance indicators.

Based on the first status report, the performance rating determiner 224 will determine whether the high priority band is performing well or not. Based on the performance rating for the high priority band and the first status report including the number of instances that UE 306 connected to the high priority band, mmwave band 308, the adjuster 228 will dynamically adjust the time frame that the UE has to connect to the high priority band. For example, the time frame may be adjusted to 300 milliseconds, which may increase the number of instances that UE 306 is able to connect to mmwave band 308. The system will determine what number of instances is considered to be high versus low for a given set of UEs.

Previously, the time frame for receiving the data indicating the number of instances in which each UE connected to the high priority band was static and could not be changed.

By utilizing the features disclosed in the present disclosure, performance of each UE is overall improved and there is better utilization of resources. If the performance rating determiner 224 determines that the performance rating is low for the priority band, but the instances of the UE connecting to the band within the defined time frame are high, the adjuster 228 will decrease the defined time frame because the key performance indicators are not performing well, which means the system does not want too many UEs on the high priority band that is not functioning optimally. However, if the performance rating is high indicating that the high priority band is performing well, and the number of instances that the UE connected to the high priority band is low, then the adjuster 228 will increase the defined time frame to allow the UE to increase the number of instances that it can connect to the high priority band.

Figure 4:
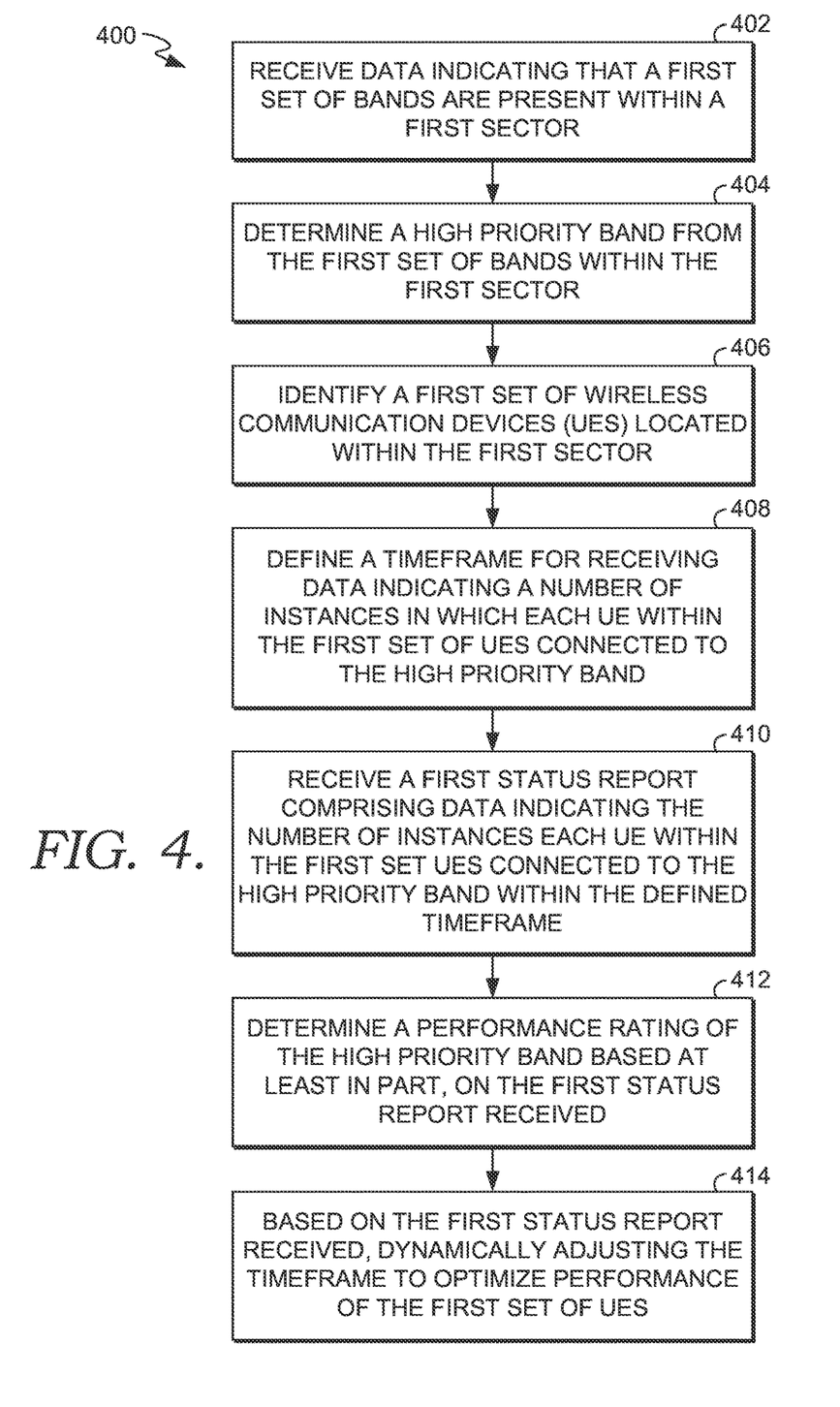
FIG. 4 depicts a flow diagram of an exemplary method for dynamically improving optimizing an EN-DC network, in accordance with aspects herein.

FIG. 4 depicts a flow diagram of an exemplary method 400 for dynamically optimizing EN-DC networks. Beginning with block 402, the data receiver, such as data receiver 216 of FIG. 2, receives data indicating that a first set of bands are present within a first sector. As mentioned, the first set of bands present within the first sector may include any number of bands such as band n41, band n25, EN-DC, etc. Once the data receiver has received data indicating that a first set of bands are present within the first sector, the band priority determiner determines which of the bands in the first set of bands is the high priority band at block 404. A band priority determiner, such as band priority determiner 228, may prioritize each band in the first set of bands from lowest to highest priority based on factors such as the predetermined bandwidth for each band. The band priority determiner may assign a ranking such as high priority, medium priority or low priority to each band or may rank each band in the first set of bands from highest priority to the lowest priority.

After determining the high priority band, a UE identifier identifies a first set of UEs that are located within the first sector at block 406. The number of UEs in the first set of UEs may be any number of UEs currently present in the sector. In other instances, the UE identifier may identify a predetermined number of UEs within the sector to be a part of the first set of UEs. Once the first set of UEs in the first sector are identified, the time frame determiner, such as time frame determiner 220, defines a time frame for receiving data indicating the number of instance in which each WCD within the first set of UEs connected to the high priority band at block 408.

A report receiver then receives a first status report that comprises data indicating how many instances each of the UEs within the first set of UEs connected with the high priority band within the defined time frame at block 410. Therefore, if the time frame is 300 milliseconds, the first status report received by the report receiver will include each instance in which each UE within the first set of UEs connected with the high priority band within the 300 millisecond time frame.

A performance rating determiner will then determine the performance rating at block 412 indicating whether the high priority band has a high or low performance rating. The performance rating given may also be an assigned value. For example, the high priority band may be given a performance rating of 80 out of 100. Then, depending on a threshold value set, the performance rating may be determined to be high or low. For example, if a threshold value is set of 90 out of 100 for a high priority band to have high performance, then in the present example, the high priority band would fall below the threshold value.

After analysis of the first status report, an adjuster, such as adjuster 228, will dynamically adjust the time frame to optimize performance of the first set of UEs at block 414. As discussed, the dynamic adjustment may be an increase or decrease in the time frame for receiving data indicating the number of UEs that connected with the high priority band. In the example above, since the high priority band was given a performance rating of 80 out of 100 which is below the threshold of 90 out of 100 for high performance, the adjuster can dynamically adjust the time frame for receiving data from 300 milliseconds to 450 milliseconds to allow for more time for more instances of each UE in the first set of UEs connecting to the high priority band. This will improve performance of the EN-DC network and utilize better resources.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A system for dynamically optimizing evolved non-standalone dual connectivity (EN-DC) networks, the system comprising:
 a first node configured to wirelessly communicate with at least one user equipment (UE) in a geographic service area; and
 one or more processors configured to perform operations comprising:
 receiving data indicating that a first set of bands is present within a first sector;
 determining a high priority band from the first set of bands within the first sector;
 identifying a first set of UEs located within the first sector;
 defining a time frame for receiving data indicating a number of instances in which each UE within the first set of UEs connected to the high priority band;
 receiving a first status report comprising the data indicating the number of instances each UE within the first set of UEs connected to the high priority band;
 determining a performance rating of the high priority band based, at least in part, on the first status report received; and
 based on the first status report received and the performance rating for the high priority band, dynamically adjusting the time frame to optimize the performance of the first set of UEs.

2. The system of claim 1, wherein the system further assigns a priority ranking to each of the first set of bands identified from highest priority to lowest priority.

3. The system of claim 1, wherein the first set of bands comprise one or more of band n41, band n71, band n25, 5G EN-DC, 5G, and LTE.

4. The system of claim 1, wherein each band of the first set of bands is assigned a predetermined bandwidth.

5. The system of claim 4, wherein the high priority band is determined to be the band within the first set of bands having a highest predetermined bandwidth.

6. The system of claim 1, wherein the predetermined time frame is increased based on the first status report received and the performance rating for the high priority band.

7. The system of claim 1, wherein the predetermined time frame is decreased based on the first status report received and the performance rating for the high priority band.

8. The system of claim 1, wherein the system further determines whether the number of instances in which each UE within the first set of UE s connected to the high priority band is below a predetermined threshold value.

9. The system of claim 8, wherein when the number of instances in which each UE within the first set of UEs connected to the high priority band is below the predetermined threshold value, dynamically increasing the time frame for receiving data indicating the number of instances in which each UE within the first set of UEs connected to the high priority band.

10. A method for dynamically optimizing evolved non-standalone dual connectivity (EN-DC) networks, the system comprising:
 receiving data indicating that a first set of bands are present within a first sector;
 determining a high priority band from the first set of bands within the first sector;
 identifying a first set of user equipment (UE) located within the first sector;
 defining a time frame for receiving data indicating a number of instances in which each UE within the first set of UEs connected to the high priority band;
 receiving a first status report comprising data indicating the number of instances each UE within the first set of UEs connected to the high priority band within the defined time frame; and
 based on the first status report received, dynamically adjusting the time frame to optimize performance of the first set of UEs.

11. The method of claim 10, further comprising determining that the number of instances in which each UE within the first set of UEs connected to the high priority band is below a predetermined instance threshold.

12. The method of claim 11, further comprising determining a performance rating based on one or more key performance indicators.

13. The method of claim 12, further comprising determining whether the performance rating is above or below a performance rating threshold.

14. The method of claim 13, wherein when the performance rating is above the performance rating threshold, increasing the time frame for receiving data indicating the number of instances in which each UE within the first set of UEs connected to the high priority band.

15. The method of claim 13, wherein when the performance rating is below the performance rating threshold, decreasing the time frame for receiving data indicating the number of instances in which each UE within the first set of UEs connected to the high priority band.

16. A system for dynamically optimizing evolved non-standalone dual connectivity (EN-DC) networks, the system comprising:
 a first node configured to wirelessly communicate with at least one user equipment (UE) in a geographic service area; and
 one or more processors configured to perform operations comprising:
 receiving data indicating that a first set of bands are present within a first sector;
 determining a high priority band from the first set of bands within the first sector;
 identifying a first set of UEs located within the first sector;
 defining a time frame for receiving data indicating a number of instances in which each UE within the first set of UEs connected to the high priority band;
 receiving a first status report comprising data indicating the number of instances each UE within the first set of UEs connected to the high priority band within the defined time frame; and
 based on the first status report received within the defined time frame, dynamically adjusting the time frame to optimize performance of the first set of UEs.

17. The system of claim 16, wherein the system further determines a performance rating of the high priority band based, at least in part, on the first status report received.

18. The system of claim 17, wherein the performance rating of the high priority band based is based on historical key performance indicator data.

19. The system of claim 16, wherein the system further determines a number of UEs connected to the high priority band.

20. The system of claim 16, wherein dynamically adjusting the time frame optimizes resource allocation.

* * * * *